(12) United States Patent
Yoshikawa (10) Patent No.: US 7,095,443 B2
(45) Date of Patent: Aug. 22, 2006

(54) FOCUSING STATE DETERMINING APPARATUS

(75) Inventor: Kazuo Yoshikawa, Saitama (JP)

(73) Assignee: Fujinon Corporation, Saitama (JP)

( * ) Notice: Subject to any disclaimer, the term of this patent is extended or adjusted under 35 U.S.C. 154(b) by 615 days.

(21) Appl. No.: 10/108,352

(22) Filed: Mar. 29, 2002

(65) Prior Publication Data
US 2002/0140838 A1    Oct. 3, 2002

(30) Foreign Application Priority Data
Mar. 30, 2001    (JP)    ............... 2001-100488

(51) Int. Cl.
*G03B 13/00*    (2006.01)

(52) U.S. Cl. .............. 348/350; 348/336; 348/345; 348/354

(58) Field of Classification Search ............. 348/345, 348/349, 350, 336, 354
See application file for complete search history.

(56) References Cited

U.S. PATENT DOCUMENTS 4,507,679 A * 3/1985 Bendell ................ 348/238
5,436,661 A * 7/1995 Yamamoto et al. ......... 348/264
5,889,555 A * 3/1999 Kawase et al. ............ 348/336
6,362,852 B1 * 3/2002 Ito .......................... 348/345

FOREIGN PATENT DOCUMENTS

JP    8-50227 A    2/1996

* cited by examiner

*Primary Examiner*—Tuan Ho
*Assistant Examiner*—Anthony Daniels
(74) *Attorney, Agent, or Firm*—Harness, Dickey & Pierce, P.L.C.

(57) ABSTRACT

In a color separation optical system in a camera, subject light entering focus-imaging elements, to which optical path lengths from the taking lens are different, is obtained with a light dividing face. The focusing state is determined with focus evaluation values according to high frequency components of images captured by the focus-imaging elements. Thus, the focusing state can be quickly determined by a simple construction without using the wobbling method. The green light in the subject light entering the color separation optical system is transmitted through a blue light separation prism and a red light separation prism, and is divided into a reflected light and a transmitted light by a beam splitter face, which is a contact face between a first green light separation prism and a second green light separation prism. The light reflected on the beam splitter face exits from the color separation optical system as the subject light for determining the focusing state, and enters the focus-imaging element.

9 Claims, 11 Drawing Sheets

FOCUSING STATE DETERMINING APPARATUS

BACKGROUND OF THE INVENTION

1. Field of the Invention

The present invention relates to a focusing state determining apparatus, and more specially, to a focusing state determining apparatus applied for a television camera and so on in which subject light separated in a color separation optical system is imaged by a picture-imaging element for each color.

2. Description of the Related Art

In a device for determining a focusing state of a television camera and a video camera for example, a method is known that a high frequency component is extracted from an image signal captured by an imaging element, and a focus evaluation value representing sharpness (contrast) of the image is obtained from the high frequency component so that the largest (maximum) focus evaluation value is detected.

A wobbling method is also known where a focus lens of a taking lens or the imaging element is vibrated periodically (wobbled) so that the focusing state is determined from the fluctuation of the focus evaluation value.

Concerning the wobbling method, in order to solve the problem in that image quality is deteriorated because of the wobbling of the imaging element and a camera cannot function quickly, Japanese Patent Application Publication No. 8-50227 discloses the following technique. Subject light entering the camera body through the taking lens is generally separated by a color separation optical system and applied to each picture-imaging element for each color. In the color separation optical system, a branch optical path is formed, which is different from optical paths of the subject light applied to the picture-imaging elements. The subject light on the branch optical path is applied to a focus-imaging element different from the picture-imaging elements. Then, the focus-imaging element is wobbled along the optical axis. According to this technique, the image quality is not deteriorated by the wobbling, and a focusing can be quickly performed because the amount of the wobbling can be increased.

In the wobbling method, a plurality of focus evaluation values that are obtained in time series while wobbling are compared to each other so as to determine the focusing state. Hence, the focusing state cannot be determined quickly in the wobbling method disclosed in Japanese Patent Application Publication No. 8-50227. Moreover, there are problems that a construction of the apparatus is complicated, the apparatus is large and the cost is high, since a special driving device for wobbling the imaging element is required.

SUMMARY OF THE INVENTION

The present invention has been achieved considering these situations, and has an object to provide a focusing state determining apparatus that can quickly determine a focusing state by a simple construction without using the wobbling method.

In order to attain the above described object, the present invention is directed to a focusing state determining apparatus for a camera including a plurality of picture-imaging elements for different colors, the focusing state determining apparatus comprising: a focus-imaging element; a color separation optical system which separates subject light entering the focusing state determining apparatus through a taking lens into a plurality of colors of light respectively entering the plurality of picture-imaging elements, wavelength bands of the plurality of colors of light being different to each other; and a first beam splitter included in the color separation optical system, the first beam splitter splitting one of the plurality of colors of light into light entering the focus-imaging element and light entering the picture-imaging element of a corresponding color, wherein: an optical path length between the taking lens and the focus-imaging element is different from an optical path length between the taking lens and one of the plurality of picture-imaging elements; focus evaluation values are obtained from high frequency components of image signals captured by the focus-imaging element and the one of the plurality of picture-imaging elements; and a focusing state of the taking lens with respect to the plurality of picture-imaging elements is determined according to the focus evaluation values.

Preferably, the focusing state determining apparatus further comprises a second beam splitter which divides the light exiting from the first beam splitter toward the focus-imaging element.

In order to attain the above described object, the present invention is also directed to a focusing state determining apparatus for a camera including a plurality of picture-imaging elements for different colors, the focusing state determining apparatus comprising: a focus-imaging device including first and second focus-imaging elements; a color separation optical system which separates subject light entering the focusing state determining apparatus through a taking lens into a plurality of colors of light respectively entering the plurality of picture-imaging elements, wavelength bands of the plurality of colors of light being different to each other; a first beam splitter included in the color separation optical system, the first beam splitter splitting one of the plurality of colors of light into light entering the focus-imaging device and light entering the picture-imaging element of a corresponding color; and a second beam splitter which splits the light exiting from the first beam splitter toward the focus-imaging device into light entering the first focus-imaging element and light entering the second focus-imaging element, wherein: an optical path length between the taking lens and the first focus-imaging element is different from an optical path length between the taking lens and the second focus-imaging element; focus evaluation values are obtained from high frequency components of image signals captured by the first and second focus-imaging elements; and a focusing state of the taking lens with respect to the plurality of picture-imaging elements is determined according to the focus evaluation values.

The focusing state determining apparatus can be applied for determining the focusing state of the taking lens in autofocus control of the taking lens.

According to the present invention, a plurality of focus-imaging elements to which optical path lengths are different are used, the focusing state is determined with focus evaluation values according to high frequency components of images captured by the focus-imaging elements, and a necessary subject light entering the focus-imaging elements is obtained with a light dividing face (a beam splitter and so on) provided in a color separation optical system of a camera body, so that the focusing state can be quickly determined by a simple construction without using the wobbling method.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
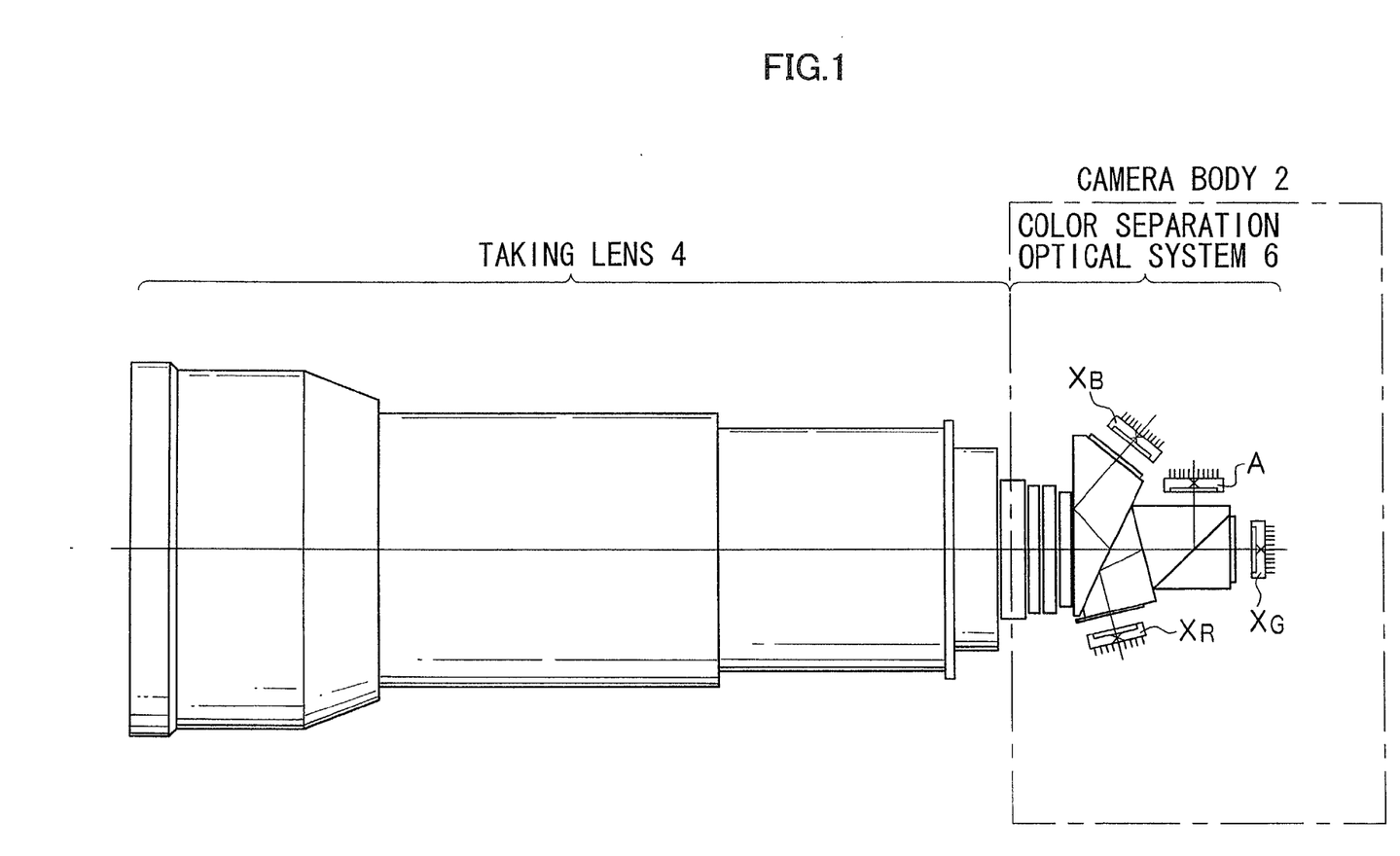
FIG. 1 is a view showing a color separation optical system in a camera body of a television camera.

In an optical system of a television camera, subject light passes through a taking lens 4 mounted to a camera body 2 in FIG. 1, and the subject light exiting from the taking lens 4 enters a color separation optical system 6 in the camera body 2. As mentioned below about the color separation optical system 6 in detail, the subject light entering the color separation optical system 6 is separated into lights of the respective wavelength bands of red, blue and green, and enters each imaging element (e.g., two-dimensional CCD) for picturing $X_B$, $X_R$ and $X_G$ for each color. A color picture is produced from image signals outputted from these picture-imaging elements $X_B$, $X_R$ and $X_G$. Hereinafter, one of the picture-imaging elements $X_B$, $X_R$ and $X_G$ is referred to as a picture-imaging elements X.

In a focusing state determining apparatus according to an embodiment of the present invention, a branch optical path, through which a part of the subject light used for determining a focusing state is guided, is formed in the color separation optical system 6, and imaging elements (e.g., two-dimensional CCDs) for focusing that capture images of the subject with the subject light passing through the branch optical path are arranged (mentioned below in detail). A plurality (at least more than two) of the focus-imaging elements are arranged; however, the picture-imaging element X may also serve as one of the focus-imaging elements. Alternatively, all of the focus-imaging elements may be provided independently of the picture-imaging element X. The plurality of focus-imaging elements are arranged so that optical path lengths from the taking lens 4 to imaging faces of the focus-imaging elements are different from each other. According to images of the subject captured by the plurality of focus-imaging elements to which optical path lengths are different, the focusing state is determined quickly and accurately as described below in detail.

Figure 2:
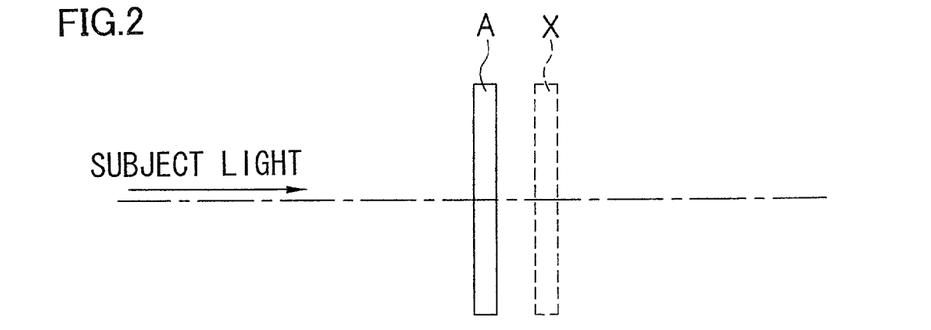
FIG. 2 is a view showing an example where a single dedicated focus-imaging element is arranged.
Figure 3:
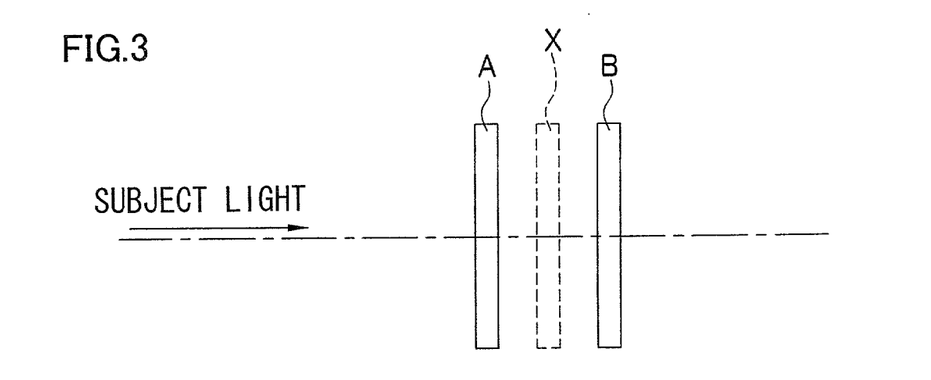
FIG. 3 is a view showing an example where two dedicated focus-imaging elements are arranged.
Figure 4:
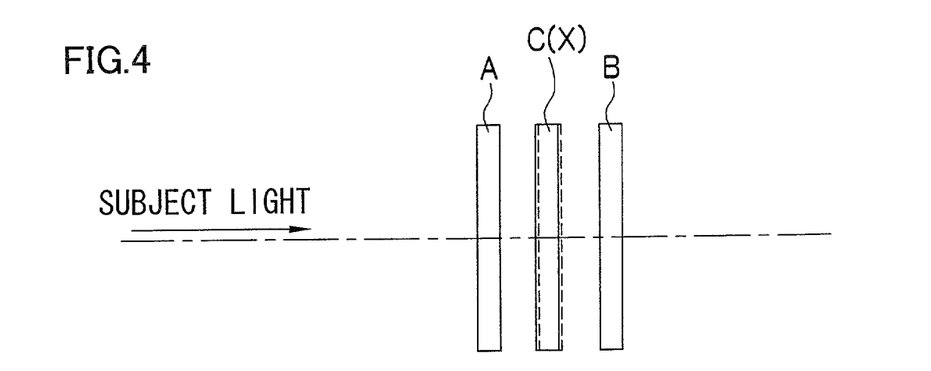
FIG. 4 is a view showing an example where three dedicated focus-imaging elements are arranged.

First, a principle of determining the focusing state will be described in the focusing state determining apparatus according to the present embodiment. FIGS. 2 to 4 are views showing optical axes of the subject light entering the picture-imaging element X and the focus-imaging element(s) provided independently of the picture-imaging element X (optical axes of the imaging elements) on the same straight line, where three examples of optical arrangements of the focus-imaging element(s) are shown.

FIG. 2 is a view showing an example where a single dedicated focus-imaging element A is arranged. In this example, the focus-imaging element A is arranged so that an optical path length of the subject light from the taking lens 4 to the imaging face of the focus-imaging element A is shorter than an optical path length of the subject light from the taking lens 4 to the imaging face of the picture-imaging element X. That is, the optical path length of the focus-imaging element A is shorter than the optical path length of the picture-imaging element X. In this example, one picture-imaging element X among the plurality of picture imaging elements $X_B$, $X_R$ and $X_G$ also serves as one of the focus-imaging elements. The imaging face of the imaging element X is arranged at a focusing plane of the camera body 2. If the single imaging element for only focusing is thus arranged, the focusing state is determined according to the images captured by two imaging elements A and X whose optical path lengths are different. It is proper that the dedicated focus-imaging element A is arranged at the position to which the optical path length is longer than the picture-imaging element X.

FIG. 3 is a view showing an example where two dedicated focus-imaging elements A and B are arranged. In this example, the focus-imaging element A is arranged at the position to which optical path length is shorter than the picture-imaging element X, and the focus-imaging element B is arranged at the position to which optical path length is longer than the picture-imaging element X. In this embodiment, differences of the optical path lengths between the focus-imaging elements A and the picture-imaging element X and between the picture-imaging element X and the focus-imaging element B are equal to each other. In this case, only two dedicated imaging elements A and B may be used as the focus-imaging elements, and the focusing state can be determined according to images captured by the imaging elements A and B. Alternatively, one of the picture-imaging element X can be also used as the focus-imaging element, whereby three imaging elements A, B and X are used as the focus-imaging elements, so that the focusing state can be determined according to images captured by the three imaging elements A, B and X.

FIG. 4 is a view showing an example where three dedicated focus-imaging elements A, B and C are arranged. In this example, the focus-imaging elements A and B are the same as the case in FIG. 3, and the dedicated focus-imaging element C is arranged at the position that is optically conjugate with the picture-imaging element X (a conjugate position with respect to the imaging element X). In this case, the three imaging elements A, B and C are used as the focus-imaging elements, so that the focusing state can be determined according to images captured by the three imaging elements A, B and C.

Two focus-imaging elements including the picture-imaging element X that also serves as the focus-imaging element are sufficient for determining the focusing state, and three or more focus-imaging elements can be used. It is sufficient that at least one focus-imaging element is arranged at the position to which the optical path length is longer than the conjugate position with respect to the imaging element X and at least one focus-imaging element is arranged at the position to which the optical path length is shorter than the conjugate position with respect to the imaging element X. Focusing operation with four or more focus-imaging elements is similar to that with three focus-imaging elements, and description therefore is omitted.

Figure 5:
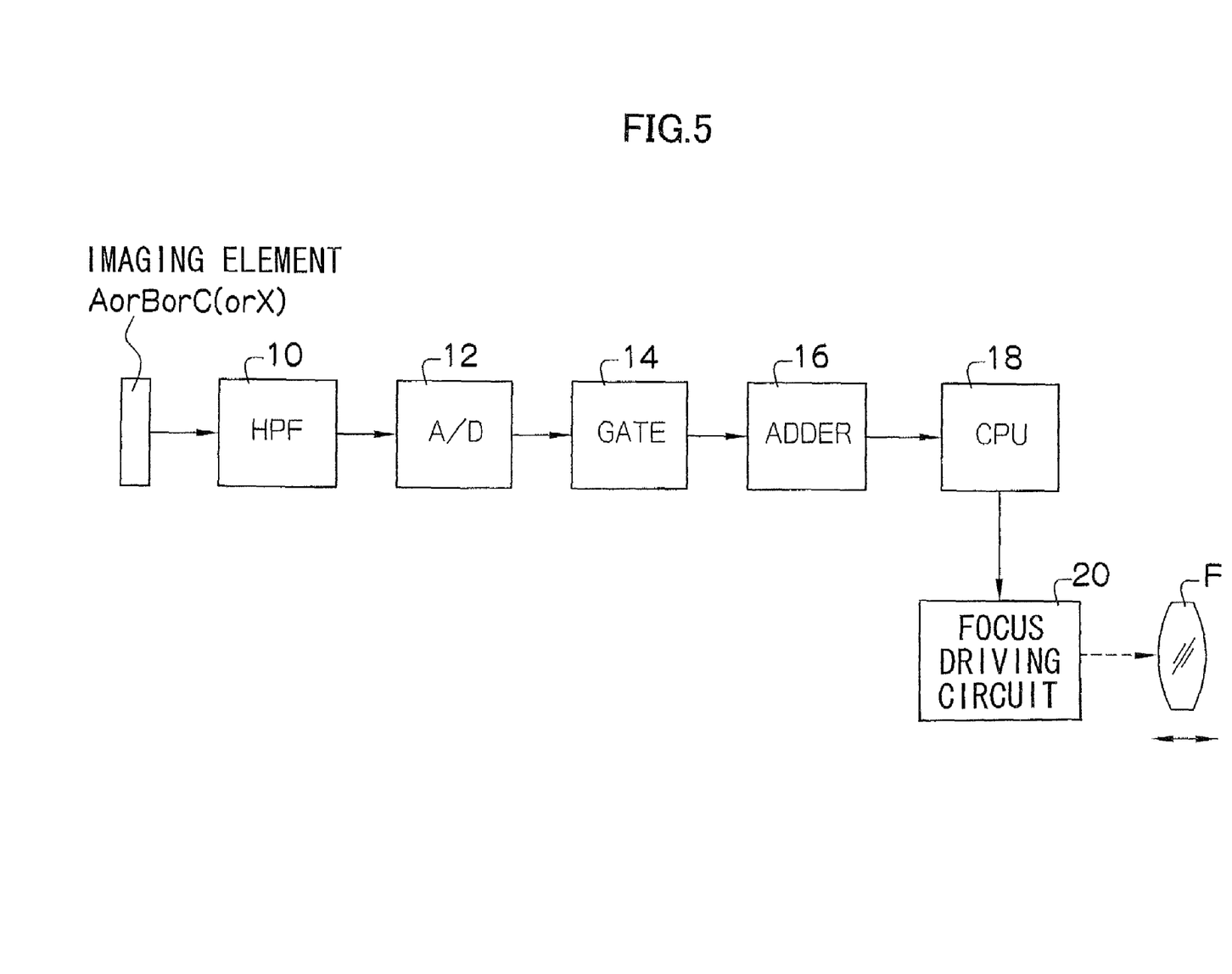
FIG. 5 is a block diagram of a signal processing circuit in a focusing state determining.

FIG. 5 is a block diagram of a signal processing circuit provided for each of the focus-imaging elements. FIG. 5 shows only signal processing circuit provided for one of the focus-imaging elements (for example, the focus-imaging element A) among the plurality of focus-imaging elements. The signal processing circuit in FIG. 5 is described briefly because it is well known as the signal processing circuit for obtaining a focus evaluation value showing sharpness (contrast) of an image.

An image captured by the dedicated focus-imaging element A is outputted as an image signal from the imaging element A. The image signal is inputted to a high-pass filter (HPF) 10 and high frequency components of the image signal are extracted. Then, the signal of the high frequency components extracted by the HPF 10 is converted into digital signals by an A/D converter 12. Thereafter, only digital signals that are corresponding to pixels within a predetermined focus area (for example the center of the screen) among the digital signals of one screen (one field) of the image captured by the imaging element A are extracted by a gate circuit 14, and values of the extracted digital signals are added by an adder 16. Thus, the sum of the values of the high frequency components of the image signals (picture) within the focus area is obtained. The value obtained by the adder 16 is the focus evaluation value, which shows the sharpness of the image within the focus area.

Such the focus evaluation values obtained by the focus-imaging elements are applied to a CPU 18. The CPU 18 determines the present focus of the taking lens 4 with respect to the focusing plane of the camera body 2 according to the focus evaluation values obtained from the focus-imaging elements as described below. As the use of the focusing state determining apparatus of this embodiment, in the case where the focusing state determining apparatus invention is adopted to a device for determining a focusing state in autofocus, the CPU 18 determines a focusing state and outputs a control signal to a focus driving circuit 20, and a focus lens F is thereby moved and controlled so that the position of the focus lens F (the focus point) is the just-focusing position.

Figure 6:
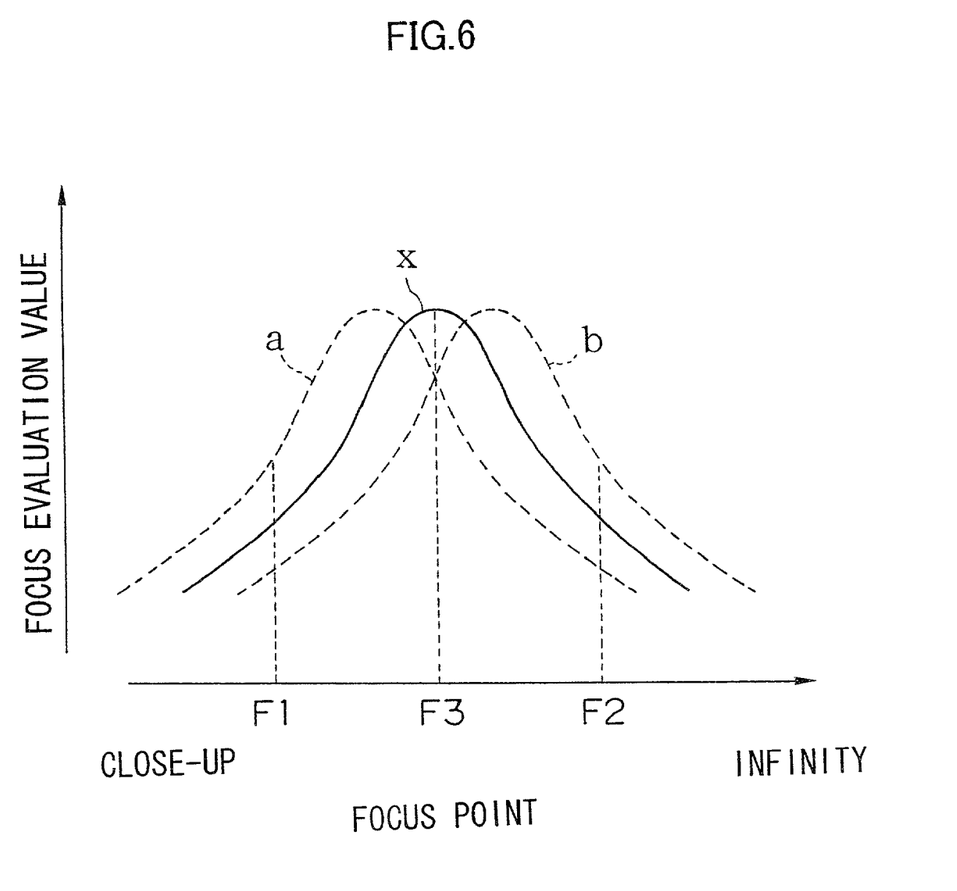
FIG. 6 is a graph showing the state of focus evaluation values with respect to focus points.

Next, the focusing state determining method in the CPU 18 will be described. First, the focusing state determining method with two focus-imaging elements is described. That is, the example shown in FIG. 3 is described where the dedicated focus-imaging elements A and B are used as the focus-imaging elements. FIG. 6 is a graph showing the state of focus evaluation values with respect to focus points in the case of taking a certain subject, where the focus points of the taking lens 4 are set at the horizontal axis and focus evaluation values are set at the vertical axis. A curve x of solid line in FIG. 6 shows the focus evaluation value with respect to the focus point in the case that the focus evaluation value is obtained according to the image signal outputted from the picture-imaging element X, and curve a and b of dotted line in FIG. 6 show the focus evaluation values which are obtained respectively from the dedicated focus-imaging elements A and B. Suppose that intensities of the subject light entering the imaging elements A and B are equal to each other.

In FIG. 6, a focus point F3 with the largest (maximum) focus evaluation value of the curve x is a just-focusing position. Now suppose that the focus point of the taking lens 4 is set at the position of F1 in FIG. 6. Then, the focus evaluation value obtained from the imaging element A is the value with respect to the focus point F1 on the curve a, and the focus evaluation value obtained from the imaging element B is the value with respect to the focus point F1 on the curve b. Therefore, the focus evaluation value obtained from the imaging element A is larger than the focus evaluation value obtained from the imaging element B. That is, when the focus point of the taking lens 4 is set to the close-up side than the focus point F3 of the just-focusing position, the focus evaluation value obtained from the imaging element A is larger than the focus evaluation value obtained from the imaging element B, and this is a state where the focusing state of the taking lens 4 is a front focusing state.

On the other hand, when the focus point of the taking lens 4 is set at a position of F2 in FIG. 6, the focus evaluation value obtained from the imaging element B is larger than the focus evaluation value obtained from the imaging element A. That is, when the focus point of the taking lens 4 is set to the infinity side than the focus point F3 of the just-focusing position, the focus evaluation value obtained from the imaging element B is larger than the focus evaluation value obtained from the imaging element A, and this is a state of where the focusing state of the taking lens 4 is a rear focusing state.

When the focus point of the taking lens 4 is set at the just-focusing position of F3 in FIG. 6, that is, the taking lens 4 is in focus, the focus evaluation values obtained from the imaging elements A and B are equal to each other.

As described above, the CPU 18 in FIG. 5 compares the focus evaluation value obtained from the imaging element A and the focus evaluation value obtained from the imaging element B. In the case that the focus evaluation value obtained from the imaging element A is larger than the focus evaluation value obtained from the imaging element B, the CPU 18 determines that the focusing state of the taking lens 4 is the front focusing state. On the contrary, in the case that the focus evaluation value obtained from the imaging element B is larger than the focus evaluation value obtained from the imaging element A, the CPU 18 determines that the focusing state of the taking lens 4 is the rear focusing state. In the case that the focus evaluation value obtained from the imaging element A is equal to the focus evaluation value obtained from the imaging element B, the CPU 18 determines that the taking lens 4 is in focus. Thus, the focusing state can be determined quickly and accurately without performing the wobbling. In autofocus control, it can be determined quickly whether the taking lens is in focus, and what direction the focus point should be moved to for focusing.

In the example in FIG. 2 where the dedicated focus-imaging element A and the picture-imaging element X are used as the focus-imaging elements, the focusing state can be determined as described above. To be precise, if the focusing state is determined as the just-focusing state when the focus evaluation values obtained from the imaging elements A and X are equal to each other, the just-focusing is obtained with respect to a center position between the imaging faces of the imaging elements A and X. However, there is no problem if the distance between the imaging faces of the imaging elements A and X is shortened so that the imaging face of the imaging element X is positioned within a depth of focus with respect to the center position.

Next, descriptions will be given for the focus determining method with three focus-imaging elements, that is, the example shown in FIG. 3 where the dedicated focus-imaging elements A and B and the picture-imaging element X are used as the focus-imaging elements, or the example shown in FIG. 4 where the dedicated focus-imaging elements A, B and C are used as the focus-imaging elements. This case is different from the case that the focusing state is determined with two focus-imaging elements, and the focus evaluation value of the curve x in FIG. 6 is actually obtained by the picture-imaging element X used for determining the focusing state (in the case of FIG. 3) or the focus-imaging element C (in the case of FIG. 4). The focus evaluation values obtained from the imaging elements A and B for a certain focus point are considered as the focus evaluation value of the imaging element X (or C) for the focus point which is displaced by a predetermined shift quantity from the focus point, because the curves a, b and x with respect to the focus evaluation values obtained from the imaging elements A, B and X (or C) are substantially the same form. For example, in the curve x of the focus evaluation values of the imaging element X (or C) in FIG. 7, suppose that the focus point is set to the position F4 in FIG. 7. Then, the focus evaluation value obtained from the imaging element X (or C) is a value of the point $P_X$ on the curve x. On the other hand, the focus evaluation value obtained from the imaging element A is a value of the point $P_A$ on the curve x for the focus point F5, which is displaced by a predetermined shift quantity to the infinity side from the focus point F4, and the focus evaluation value obtained from the imaging element B is a value of the point $P_B$ on the curve x for the focus point F6, which is displaced by a predetermined shift quantity to the close-up side from the focus point F4. Further, the difference between the focus point F4 and the focus point F5, that is the shift quantity in the focus evaluation value obtained from the imaging element A is equal to the difference between the focus point for the maximum point of the curve a and the focus point for the maximum point of the curve x in FIG. 6. Then, the difference between the focus point F4 and the focus point F6, that is the shift quantity in the focus evaluation value obtained from the imaging element B is equal to the difference between the focus point for the maximum point of the curve b and the focus point for the maximum point of the curve x in FIG. 6.

Figure 7:
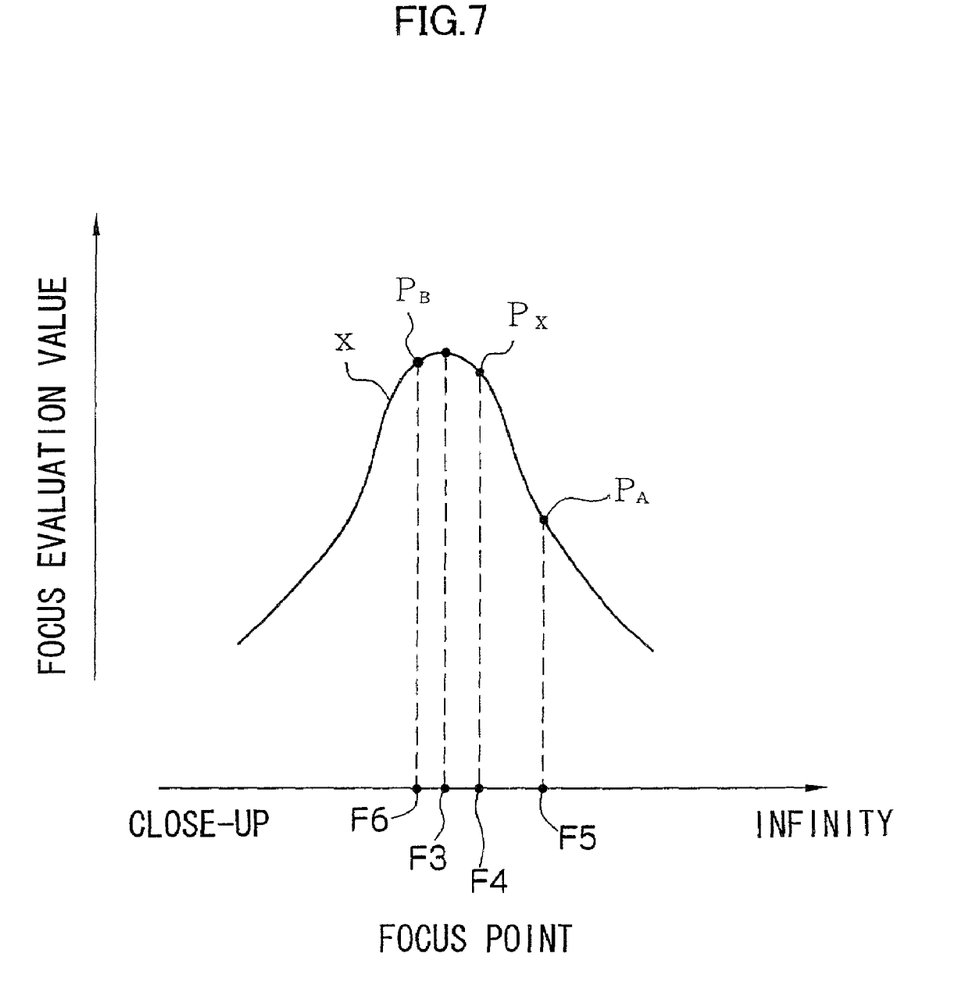
FIG. 7 is a graph used for explaining a method for determining a focusing state with three focus-imaging elements.

On the other hand, the curve x can be approximated by a predetermined function (e.g., quadratic function). Therefore, the curve x can be concretely specified from the focus evaluation values in three points $P_A$, $P_B$ and $P_X$ obtained from the imaging elements A, B and X (or C), and the focusing position F3 for the largest focus evaluation value on the curve x can be obtained.

By thus detecting the focusing point for the just-focusing state according to the focus evaluation values obtained from three imaging elements A, B and X (or C), the CPU 18 in FIG. 5 can determine quickly and accurately that the present focusing state is the front focusing state, the rear focusing state, or the just-focusing state without using the wobbling method. Furthermore, in the autofocus control, the focusing position is directly given to the focus driving circuit 20, so that the focus lens F can be moved quickly to the focusing position.

In the above description, the imaging element A and the imaging element B are arranged in front and behind at the position of which the imaging face is the same length in optical with respect to the picture-imaging element X. In the case that a focusing state is determined by three focus-imaging elements, it is sufficient that the imaging elements A, B and X are arranged as the optical path lengths are different, as well as at least one of the imaging elements A and B is arranged at the position of which the optical path length is longer than the imaging element X and the other of the imaging elements A and B is arranged at the position of which the optical path length is shorter than the imaging element X. That is, as described above, in the case that the focus evaluation values obtained from the imaging elements A and B for a certain focus point are considered as the focus evaluation value of the imaging element X (C) for the focus point displaced by the predetermined shift quantity from the focus point, it is proper that the shift quantity is set according to the distance to the imaging element X from the imaging elements A and B. In the case in FIG. 4, the imaging face of the focus-imaging element C is arranged at the conjugate position of the imaging face of the picture-imaging element X, but it is not necessary to do so.

Figure 8:
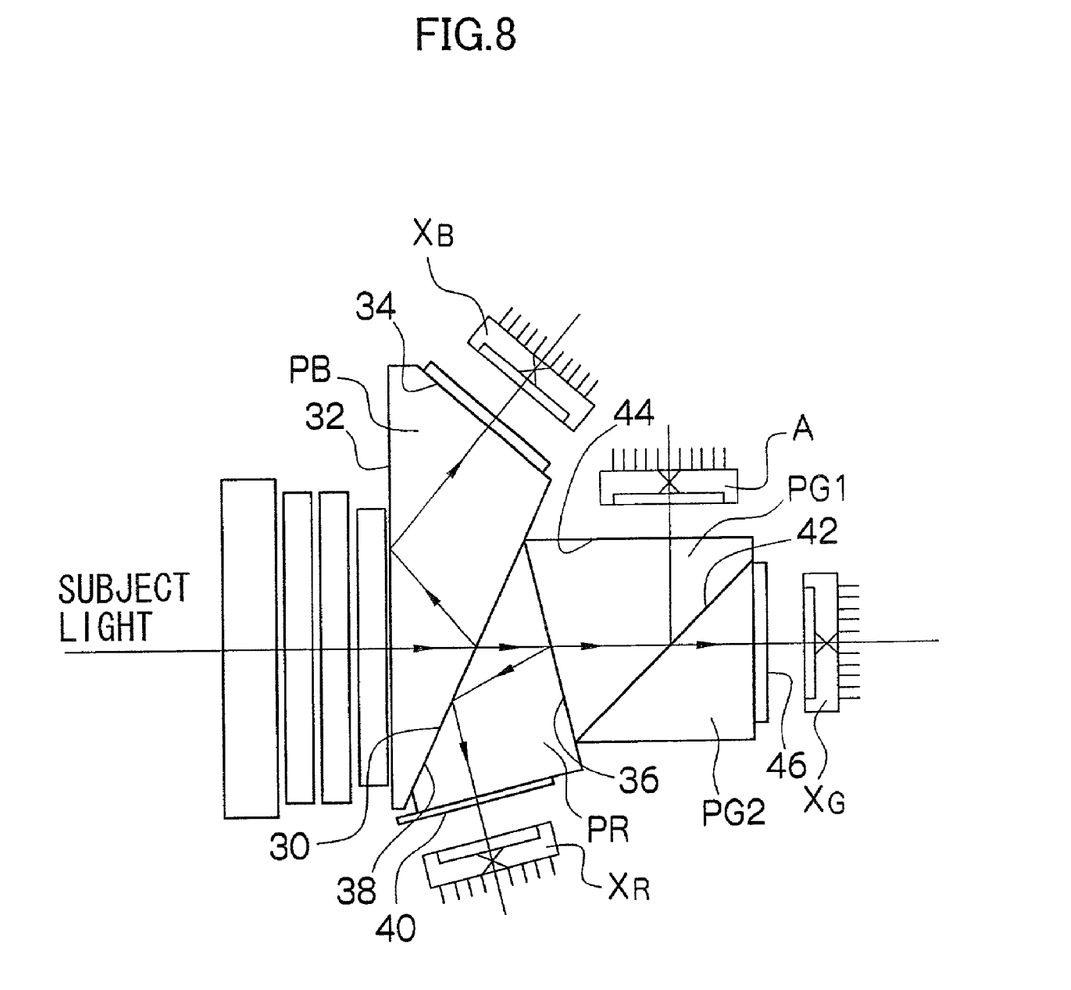
FIG. 8 is a view of construction of the color separation optical system of a first embodiment.

Embodiments are described according to FIGS. 2, 3 and 4 where the color separation optical system 6 is constructed so that the focus-imaging element(s) is arranged at the position(s) with respect to the picture-imaging element X (the picture-imaging elements $X_B$, $X_R$ and $X_G$). FIG. 8 is a magnified view showing construction of a first embodiment where the color separation optical system 6 in FIG. 1, where one branch optical path dedicated for determining the focusing state is provided in the color separation optical system 6 and one dedicated focus-imaging element A is arranged as shown in FIG. 2. The color separation optical system 6 in FIG. 8 comprises a blue light separation prism PB, a red light separation prism PR, a first green light separation prism PG1 and a second green light separation prism PG2. In FIG. 8, the subject light passing through the taking lens 4 enters the blue light separation prism PB. A blue reflection dichroic film is provided on a face 30 of the blue light separation prism PB. A blue component light (a blue light) among the subject light entering the blue light separation prisms PB is reflected on the face 30, and a color component light except the blue component light is transmitted through the face 30. Then, the blue light reflected on the face 30 is reflected on a face 32 of the blue light separation prism PB as total internal reflection, exits from the blue light separation prism PB through a face 34, and enters the imaging face of the picture-imaging element $X_B$ for blue. On the other hand, the subject light that is transmitted through the face 30 enters the red light separation prism PR. A red reflection dichroic film is provided on a face 36 of the red light separation prisms PR. A red component light (a red light) among the subject light entering the red light separation prisms PR is reflected on the face 36, and a color component (green component) light (green light) except the red component light is transmitted through the face 36. Then, the red light reflected on the face 36 is reflected on a face 38 of the red light separation prism PR as total internal reflection, exits from the light separation prisms PR trough a face 40, and enters the imaging face of the picture-imaging element XR for red. The green light, which is transmitted through the face 36, enters the first green light separation prism PG1. A contact face between the first green light separation prism PG1 and the second green light separation prism PG2 is a semitransparent mirror or a beam splitter face 42. The green light entering the first green light separation prism PG1 is divided into a reflected light and a transmitted light by this beam splitter face 42. The optical path of the reflected light is the branch optical path for determining the focusing state. The reflected light passing through the branch optical path exits from the first green light separation prism PG1 through a face 44 as the subject light for determining the focusing state, and enters the imaging face of the imaging element A that is arranged for determining the focusing state. The light transmitted through the beam splitter face 42 passes through the second green light separation prism PG2, exits from the second green light separation prism PG2 through a face 46, and enters the picture-imaging element XG for green.

Figure 9A:
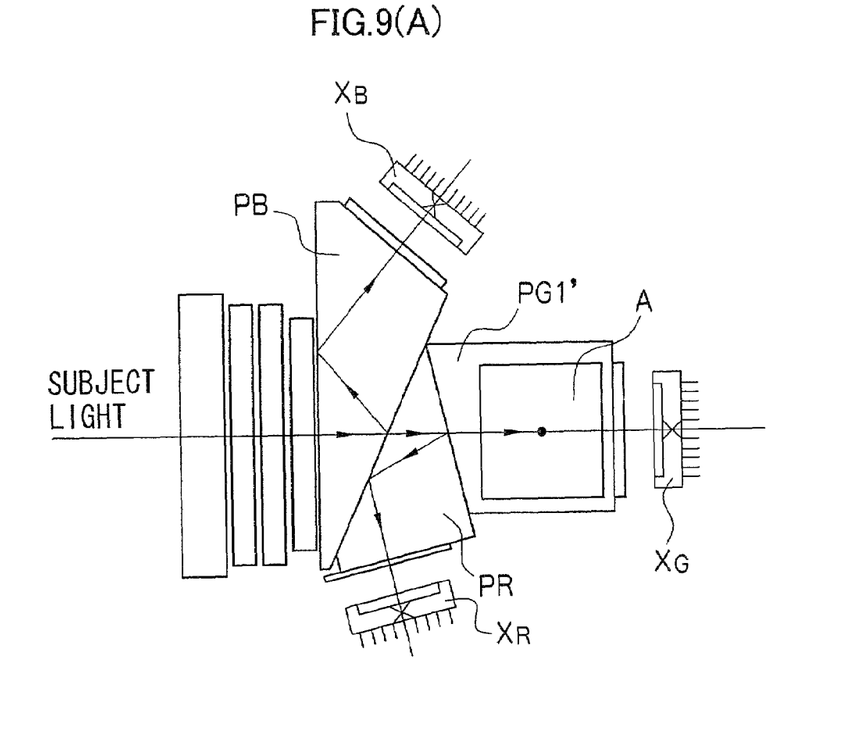
FIGS. 9(A) and 9(B) are views of another construction of the color separation optical system.
Figure 9B:
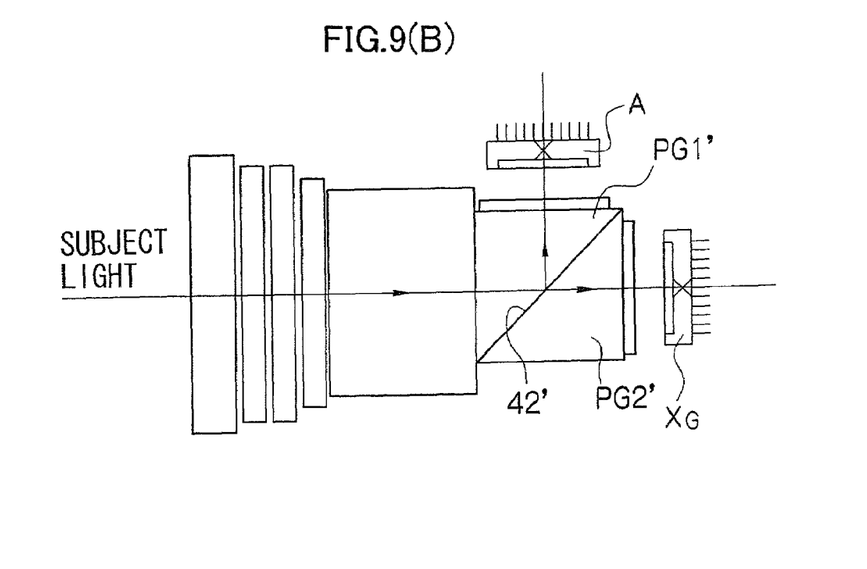

FIGS. 9(A) and 9(B) are views showing a construction of the color separation optical system 6 similar to that of FIG. 8, where the green light reflected in the horizontal direction of the drawing on the beam splitter face 42 between the first green light separation prism PG1 and the second green light separation prism PG2 is reflected in the direction perpendicular to the drawing in FIG. 8. FIG. 9(A) is a plan view of the color separation optical system 6, and FIG. 9(B) is a side view thereof. In the construction in FIGS. 9(A) and 9(B), a first green light separation prism PG1' and a second green light separation prism PG2' are used instead of the first green light separation prism PG1 and the second green light separation prism PG2 in FIG. 8. The green light is divided into a reflected light and a transmitted light on a beam splitter face (a light dividing face) 42' between the first green light separation prism PG1' and the second green light separation prism PG2', and the reflected light that becomes the subject light for determining the focusing state is reflected in the direction perpendicular to the drawing in FIG. 9(A). The focus-imaging element A is arranged at the position different from that in FIG. 8, according to the direction in which the subject light for determining the focusing state is reflected.

In the case where the green light is divided as the subject light for determining the focusing state and the picture-imaging element X is used for determining the focusing state, it is preferable that the picture-imaging element XG for green is used for determining the focusing state. However, the picture-imaging element for another color can also be used for determining the focusing state (this is the same in examples described below).

Figure 10:
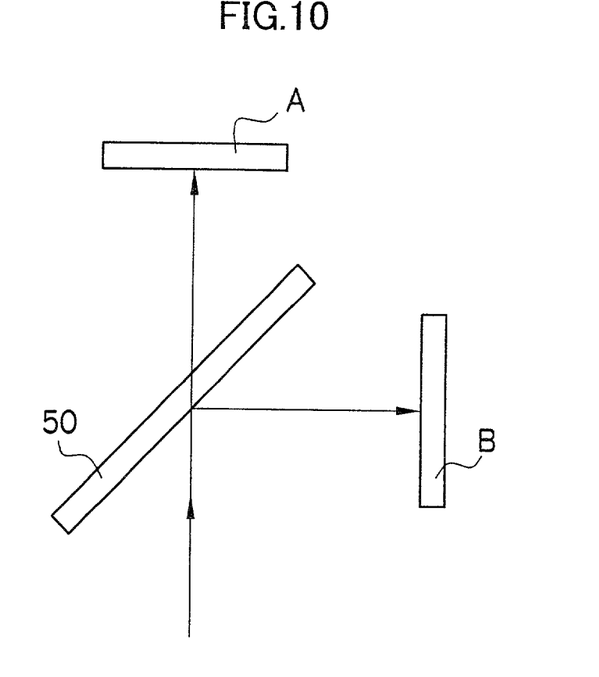
FIG. 10 is a view of construction of an example of a dividing optical system.

In the construction of the color separation optical system 6 in FIG. 8 (or FIGS. 9(A) and 9(B)), two dedicated focus-imaging elements A and B can be arranged as shown in FIG. 3. For example, a dividing optical system (a beam splitter 50) as shown FIG. 10 is arranged at the branch optical path for determining the focusing state that is divided by the beam splitter 42 (42'). The subject light (the green light) for determining the focusing state that exits from the first green light separation prism PG1 (PG1') of the color separation optical system 6 is divided into the transmitted light and the reflected light by the beam splitter 50, the transmitted light enters the focus-imaging element A, and the reflected light enters the focus-imaging element B.

Figure 11:
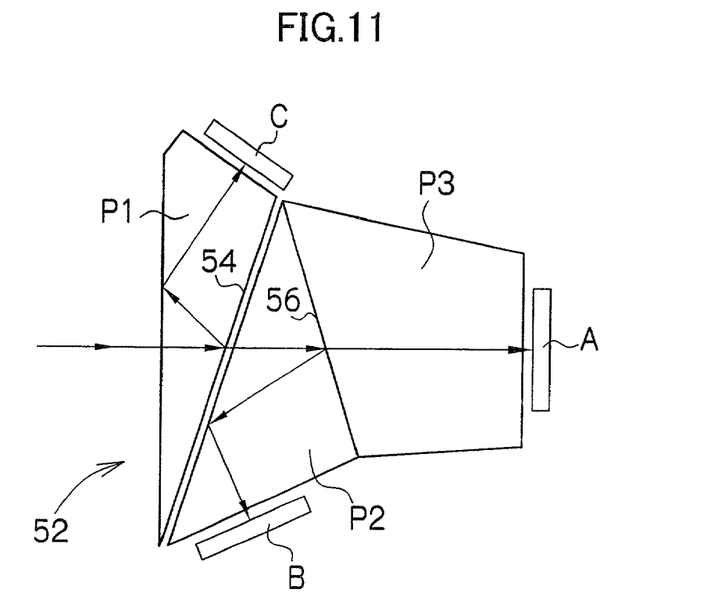
FIG. 11 is a view of construction of another example of the dividing optical system.

In the construction of the color separation optical system 6 in FIG. 8 (or FIGS. 9(A) and 9(B)), three dedicated focus-imaging elements A, B and C can be arranged as shown in FIG. 4. For example, a dividing optical system 52 as shown FIG. 11 is arranged at the branch optical path for determining the focusing state that is divided by the beam splitter 42 (42'). The dividing optical system 52 comprises three prisms P1, P2 and P3. First, the subject light (the green light) for determining the focusing state that exits from the first green light separation prism PG1 (PG1') of the color separation optical system 6 enters the first prism P1, and is divided into the transmitted light and the reflected light by a beam splitter 54 face of the first prism P1. The reflected light enters the imaging face of the focus-imaging element A. Then, the transmitted light enters the second prism P2, and is divided into the reflected light and the transmitted light by a beam splitter face 56 of the second prism P2. The reflected light enters the focus-imaging element B, and the transmitted light passes through the third prism P3 and enters the focus-imaging element C.

Figure 12:
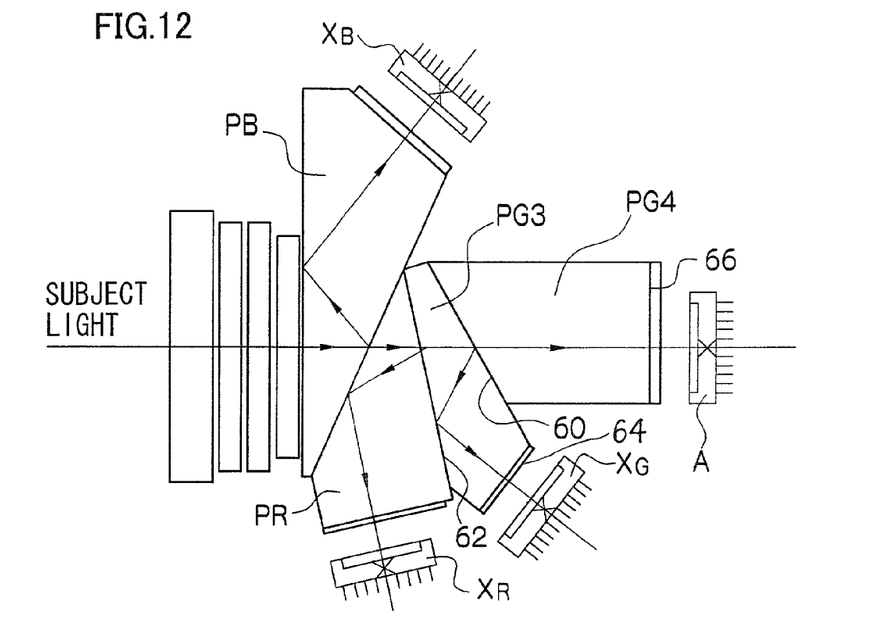
FIG. 12 is a view of construction of the color separation optical system of a second embodiment.

FIG. 12 is a view of construction of a second embodiment of the color separation optical system 6, where one dedicated branch optical path for determining the focusing state is provided in the color separation optical system 6 and one dedicated focus-imaging element A is arranged as shown in FIG. 2. The color separation optical system 6 in FIG. 12 comprises a blue light separation prism PB, a red light separation prism PR, a first green light separation prism PG3 and a second green light separation prism PG4. The blue light separation prism PB and the red light separation prism PR are the same with those in FIG. 8, and the picture-imaging elements XB and XR for blue and red are the same with those in FIG. 8, for which explanations are hence omitted. In FIG. 12, the green light passing through the blue light separation prism PB and the red light separation prism PR enters the first green light separation prism PG3. A contact face between the first green light separation prism PG3 and the second green light separation prism PG4 is a semitransparent mirror or a beam splitter face (light dividing face) 60. The green light entering the first green light separation prism PG3 is divided into a reflected light and a transmitted light by the beam splitter face 60. Then, the reflected light is reflected on a face 62 of the first green light separation prism PG3 as total internal reflection, exits from the first green light separation prism PG3 through a face 64, and enters the picture-imaging element XG for green. The optical path of the light transmitted through the beam splitter face 60 is the branch optical path for determining the focusing state. The transmitted light passes through the second green light separation prism PG4 as the subject light for determining the focusing state, exits from the second green light separation prism PG4 through a face 66, and enters the imaging face of the imaging element A that is arranged for determining the focusing state.

In the construction of the color separation optical system 6 shown in FIG. 12, the dividing optical system can be arranged on the branch optical path for determining the focusing state as described in FIG. 10 or FIG. 11, so that two dedicated focus-imaging elements A and B can be arranged as shown in FIG. 3 or three dedicated focus-imaging elements A, B and C can be arranged as shown in FIG. 4.

Figure 13:
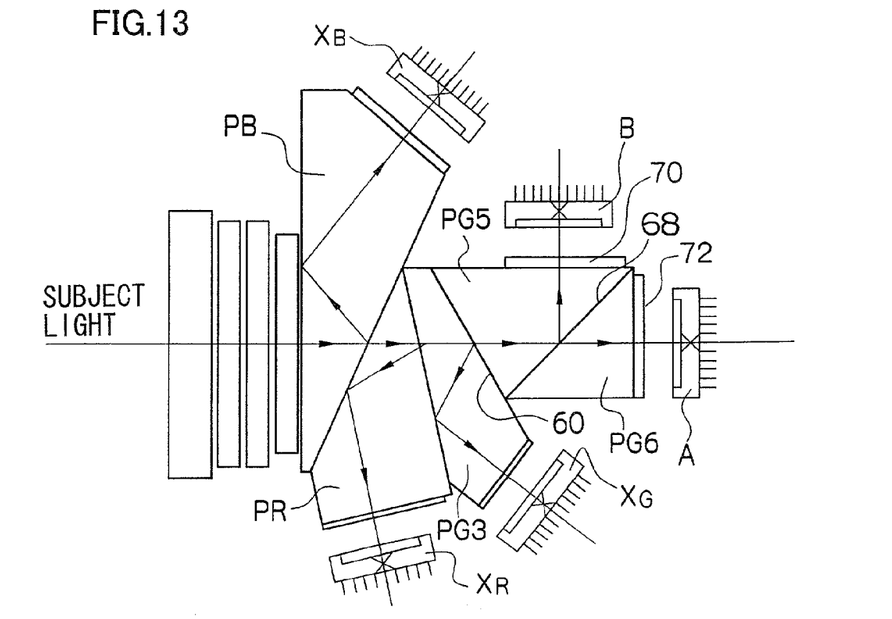
FIG. 13 is a view of construction of the color separation optical system of a third embodiment.

FIG. 13 is a view of construction of a third embodiment of the color separation optical system 6, where two dedicated branch optical paths for determining the focusing state are provided in the color separation optical system 6 and two dedicated focus-imaging elements A and B are arranged as shown in FIG. 3. The color separation optical system 6 in FIG. 13 comprises a blue light separation prism PB, a red light separation prism PR, a first green light separation prism PG3, a second green light separation prism PG5, and a third green light separation prism PG6. The blue light separation prism PB, the red light separation prism PR, and the first green light separation prism PG3 are the same with those in FIG. 12, and the picture-imaging elements $X_B$, $X_R$ and $X_G$ for blue, red, and green are the same with those as FIG. 12, for which explanations are hence omitted. In FIG. 13, the green light transmitted through the beam splitter face 60 of the first green light separation prism PG3 enters the second green light separation prism PG5 as the subject light for determining the focusing state. A contact face between the second green light separation prism PG5 and the third green light separation prism PG6 is a semitransparent mirror or a beam splitter face (light dividing face) 68. The green light entering the second green light separation prism PG5 is divided into a reflected light and a transmitted light by this beam splitter face 68. The two branch optical paths for determining the focusing state are thereby formed, and two parts of subject light for determining the focusing state are produced. The light reflected on the beam splitter face 68 exits from the second green light separation prism PG5 through a face 70, and enters the imaging face of the focus-imaging element B. The light transmitted through the beam splitter face 68 exits from the third green light separation prism PG6 through a face 72, and enters the imaging face of the focus-imaging element A.

Figure 14A:
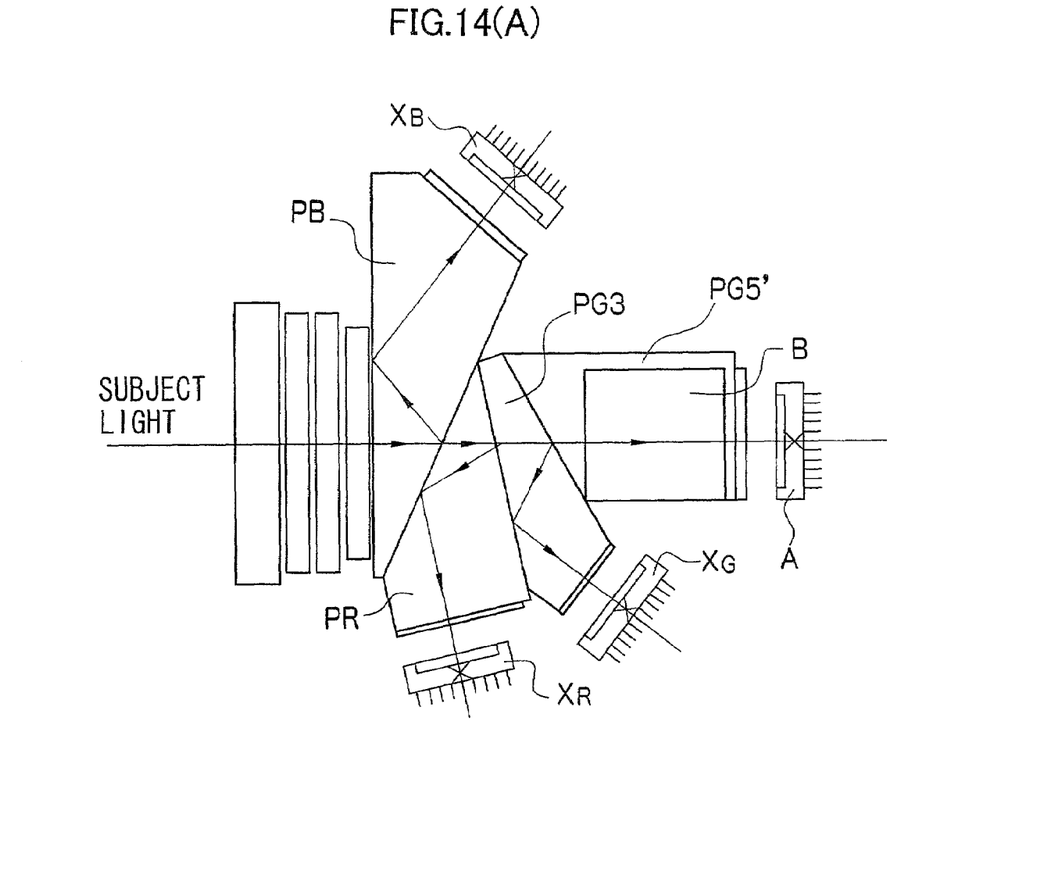
FIGS. 14(A) and 14(B) are views of another construction of the color separation optical system.
Figure 14B:
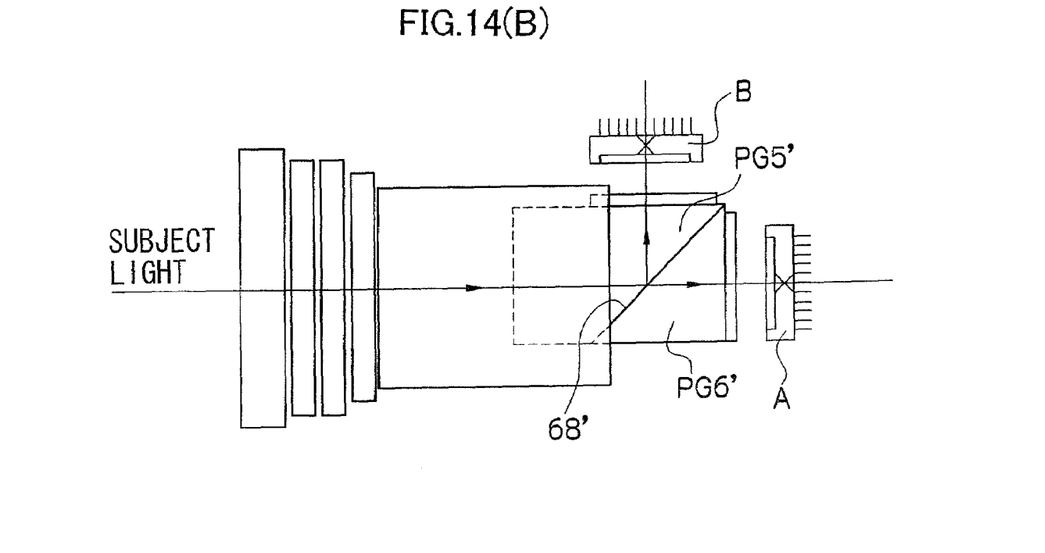

FIGS. 14(A) and 14(B) are views showing a construction of the color separation optical system 6 similar to that of FIG. 13, where the green light that is reflected in the horizontal direction of the drawing by the beam splitter face 68 between the second green light separation prism PG5 and the third green light separation prism PG6 in FIG. 13, is reflected in the direction perpendicular to the drawing in FIG. 13. FIG. 14(A) is a plan view of the color separation optical system 6, and FIG. 14(B) is a side view thereof. In the construction in FIGS. 14(A) and 14(B), a second green light separation prism PG5' and a third green light separation prism PG6' are used instead of the second green light separation prism PG5 and the third green light separation prism PG6 in FIG. 13. The green light is reflected in the direction perpendicular to the drawing in FIG. 14(A) by a beam splitter face 68' between the second green light separation prism PG5' and the third green light separation prism PG6'. The focus-imaging element B is arranged at a position different from that in FIG. 13, according to the direction in which the subject light for determining the focusing state is reflected.

In the constructions of the color separation optical system 6 in FIGS. 13 and 14, the dividing optical system described in FIG. 10 or FIG. 11 can be arranged at the branch optical path for determining the focusing state, so that more dedicated focus-imaging elements can be arranged.

Figure 15:
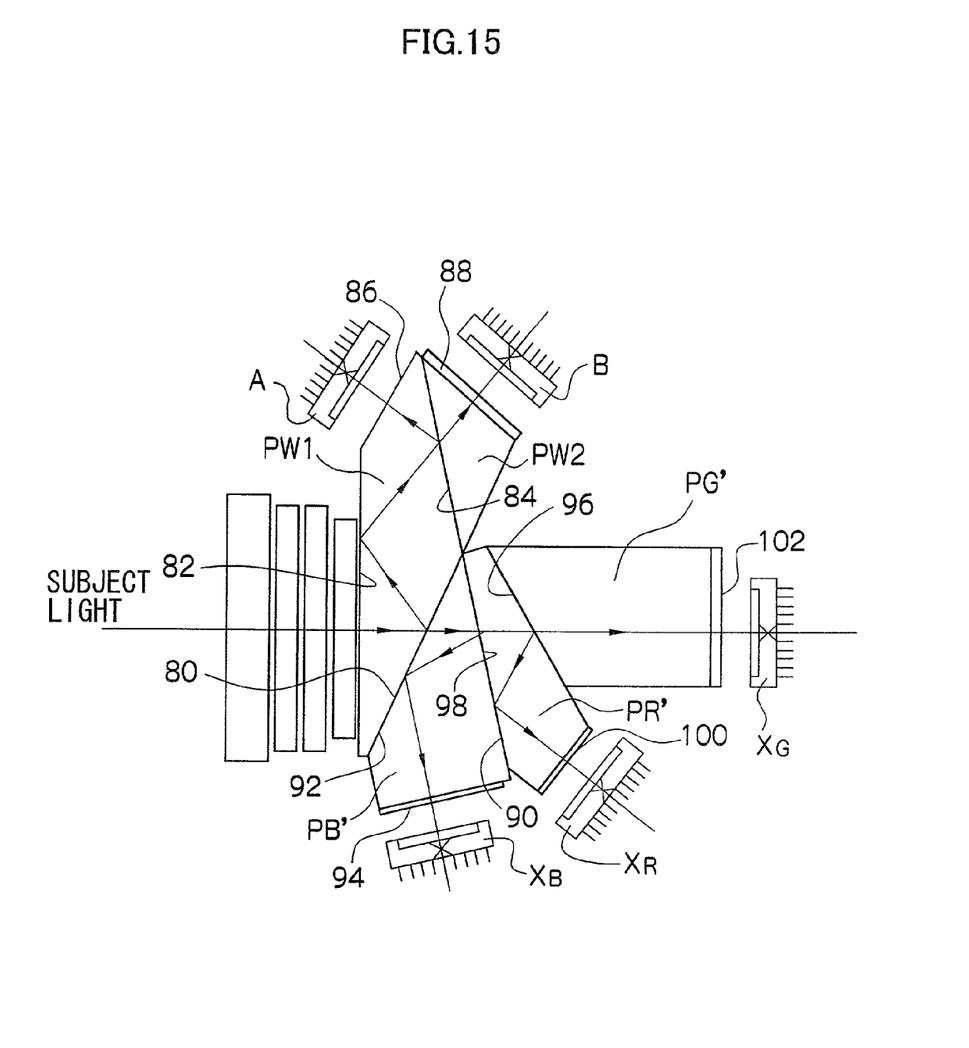
FIG. 15 is a view of construction of the color separation optical system of a forth embodiment.

FIG. 15 is a view of construction of a forth embodiment of the color separation optical system 6, where two dedicated branch optical paths for determining the focusing state are provided in the color separation optical system 6 and two dedicated focus-imaging elements A and B are arranged as shown in FIG. 3. The color separation optical system 6 in FIG. 15 comprises a first dividing prism PW1, a second dividing prism PW2, a blue light separation prism PB', a red light separation prism PR', and a green light separation prism PG'. In FIG. 15, the subject light passing through the taking lens 4 enters the first dividing prism PW1. A contact face between the first dividing prism PW1 and the blue light separation prism PB' is a semitransparent mirror or a beam splitter face (light dividing face) 80. The subject light entering the first dividing prism PW1 is divided into a reflected light and a transmitted light by this beam splitter face 80. The optical path of the subject light that is reflected on the beam splitter face 80 is a divided optical path for determining the focusing state. Then, the subject light reflected on the beam splitter face 80 is reflected on a face 82 of the first dividing prism PW1 as total internal reflection as the subject light for determining the focusing state, and is divided into a reflected light and a transmitted light by a beam splitter face (light dividing face) 84 between the first dividing prism PW1 and the second dividing prism PW2. The two branch optical paths for determining the focusing state are thereby formed, and two parts of subject light for determining the focusing state are produced. The light reflected on the beam splitter face 84 exits from the first dividing prism PW1 through a face 86, and enters the focus-imaging element A. The light transmitted through the beam splitter face 84 exits from the second dividing prism PW2 through a face 88, and enters the focus-imaging element B.

The subject light that is transmitted though the beam splitter face 80 enters the blue light separation prism PB'. A blue reflection dichroic film is provided on a face 90 of the blue light separation prisms PB'. A blue component light (a blue light) among the subject light entering the blue light separation prisms PB' is reflected on the face 90, and a color component light except the blue component light is transmitted through the face 90. Then, the blue light reflected on the face 90 is reflected on a face 92 of the blue light separation prism PB' as total internal reflection, exits from the blue light separation prisms PB' through a face 94, and enters the imaging face of the picture-imaging element $X_B$ for blue. Next, the subject light that is transmitted through the face 90 enters the red light separation prism PR'. A red reflection dichroic film is provided on a face 96 of the red light separation prisms PR'. A red component light (a red light) among the subject light entering the red light separation prisms PR' is reflected on the face 96, and a color component (green component) light (green light) except the red component light is transmitted through the face 96. Then, the red light reflected on the face 96 is reflected on a face 98 of the red light separation prism PR' as total internal reflection, exits from the red light separation prism PR' through a face 100, and enters the imaging face of the picture-imaging element $X_R$ for red. The green light transmitted through the face 96 exits from the green light separation prism PG' through a face 102, and enters the picture-imaging element $X_G$ for green.

In the construction of the color separation optical system 6 shown in FIG. 15, the dividing optical system described in FIG. 10 or FIG. 11 can be arranged on the branch optical path for determining the focusing state, so that more dedicated focus-imaging elements can be arranged.

As described above, the light dividing face is arranged at the color separation optical system 6, so that the branch optical path for determining the focusing state is provided and the subject light for determining the focusing state is produced. The embodiments described above are ones of the examples, the light dividing face can be arranged on any optical path in the color separation optical system 6, and any number of light dividing faces can be arranged.

It is preferable that transparence of the light dividing face is adjusted so that light amounts of the subject light entering the focus-imaging elements are equal to each other. However, the gains of image signals outputted from the focus-imaging elements can be adjusted so as to eliminate the difference of light amounts of the subject light entering the focus-imaging elements.

In the above embodiments, the determination of the focusing state by the focusing state determining apparatus according to the present invention is adapted to the autofocus control, but this can be used for other purposes.

As described above, according to the focusing state determining apparatus of the present invention, a plurality of focus-imaging elements to which optical path lengths are different are used, the focusing state is determined with focus evaluation values according to high frequency components of images captured by the focus-imaging elements, and a necessary subject light entering the focus-imaging elements is obtained with a light dividing face (a beam splitter and so on) provided in a color separation optical system of a camera body, so that the focusing state can be quickly determined by a simple construction without using the wobbling method.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A focusing state determining apparatus for a camera including a plurality of picture-imaging elements for different colors, the focusing state determining apparatus comprising:
    a focus-imaging element provided separately from the picture-imaging elements;
    a color separation optical system which separates subject light entering the focusing state determining apparatus through a taking lens into a plurality of colors of light respectively entering the plurality of picture-imaging elements, wavelength bands of the plurality of colors of light being different to each other; and
    a first beam splitter included in the color separation optical system, the first beam splitter splitting one of the plurality of colors of light into light entering the focus-imaging element and light entering the picture-imaging element of a corresponding color, wherein:
    optical path lengths from the taking lens to the plurality of picture-imaging elements are equal to each other;
    an optical path length between the taking lens and the focus-imaging element is different from the optical path lengths from the taking lens to the plurality of picture-imaging elements;
    focus evaluation values are obtained from high frequency components of image signals captured by the focus-imaging element and the one of the plurality of picture-imaging elements; and
    a focusing state of the taking lens with respect to the plurality of picture-imaging elements is determined according to the focus evaluation values.

2. A focusing state determining apparatus for a camera including a plurality of picture-imaging elements for different colors, the focusing state determining apparatus comprising:
    a focus-imaging element provided separately from the picture-imaging elements;
    a color separation optical system which separates subject light entering the focusing state determining apparatus through a taking lens into a plurality of colors of light respectively entering the plurality of picture-imaging elements, wavelength bands of the plurality of colors of light being different to each other;
    a first beam splitter included in the color separation optical system, the first beam splitter splitting one of the plurality of colors of light into light entering the focus-imaging element and light entering the picture-imaging element of a corresponding color; and
    a second beam splitter which divides the light exiting from the first beam splitter toward the focus-imaging; wherein
    an optical path length between the taking lens and the focus-imaging element is different from an optical path length between the taking lens and one of the plurality of picture-imaging elements,
    focus evaluation values are obtained from high frequency components of image signals captured by the focus-imaging element and the one of the plurality of picture-imaging elements, and
    a focusing state of the taking lens with respect to the plurality of picture-imaging elements is determined according to the focus evaluation values.

3. The focusing state determining apparatus as defined in claim 1, wherein the focusing state determining apparatus is applied for determining the focusing state of the taking lens in autofocus control of the taking lens.

4. A focusing state determining apparatus for a camera including a plurality of picture-imaging elements for different colors, the focusing state determining apparatus comprising:
    a focus-imaging device that is provided separately from the picture-imaging elements and includes first and second focus-imaging elements;
    a color separation optical system which separates subject light entering the focusing state determining apparatus through a taking lens into a plurality of colors of light respectively entering the plurality of picture-imaging elements, wavelength bands of the plurality of colors of light being different to each other;
    a first beam splitter included in the color separation optical system, the first beam splitter splitting one of the plurality of colors of light into light entering the focus-imaging device and light entering the picture-imaging element of a corresponding color; and
    a second beam splitter which splits the light exiting from the first beam splitter toward the focus-imaging device into light entering the first focus-imaging element and light entering the second focus-imaging element, wherein:
    an optical path length between the taking lens and the first focus-imaging element is different from an optical path length between the taking lens and the second focus-imaging element; focus evaluation values are obtained from high frequency components of image signals captured by the first and second focus-imaging elements; and
    a focusing state of the taking lens with respect to the plurality of picture-imaging elements is determined according to the focus evaluation values.

5. The focusing state determining apparatus as defined in claim 4, wherein the focusing state determining apparatus is applied for determining the focusing state of the taking lens in autofocus control of the taking lens.

6. A method for determining a focusing state of a camera including a plurality of picture-imaging elements for different colors, the method comprising:
    separating subject light, entering the camera through a taking lens, into a plurality of colors of light with different wavelength bands, each of the plurality of colors of light entering one of the plurality of picture-imaging elements, respectively;
    splitting one of the plurality of colors of light into two parts one of which enters a focus-imaging element, provided separately from the picture-imaging elements, and one of which enters the picture-imaging element of a corresponding color;
    capturing image signals using the focus-imaging element and one of the plurality of picture-imaging elements;
    obtaining focus evaluation values from the captured image signals; and determining a focusing state based on the focus evaluation values; wherein optical path lengths from the taking lens to the plurality of picture-imaging elements are equal to each other, and an optical path length between the taking lens and the focus-imaging element is different from the optical path lengths from the taking lens to the plurality of picture-imaging elements.

7. The method of claim 6, wherein the determined focusing state is one of a front focusing state, a rear focusing state, or a just-focusing state.

8. The method of claim 7, wherein the determining further includes, comparing focus evaluation values obtained from image signals captured by the focus-imaging element and one of the plurality of picture-imaging elements, and determining a focusing state based on the comparison of the captured image signals.

9. A focusing state determining apparatus adapted to perform the method of claim 6.

* * * * *